March 3, 1959     A. FARMER     2,876,041
SPRAY DEVICE
Filed April 24, 1957
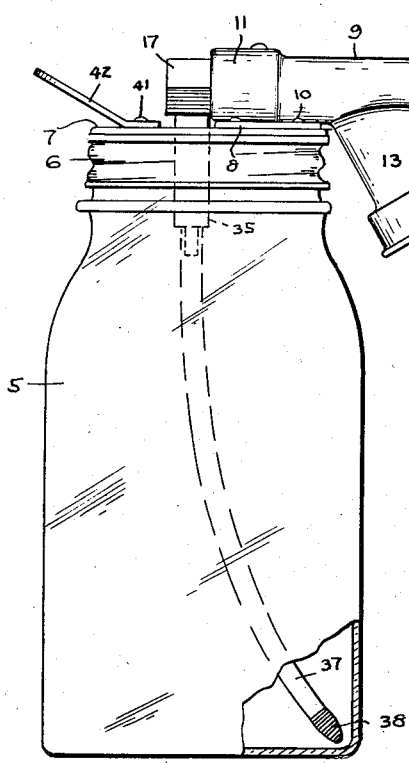
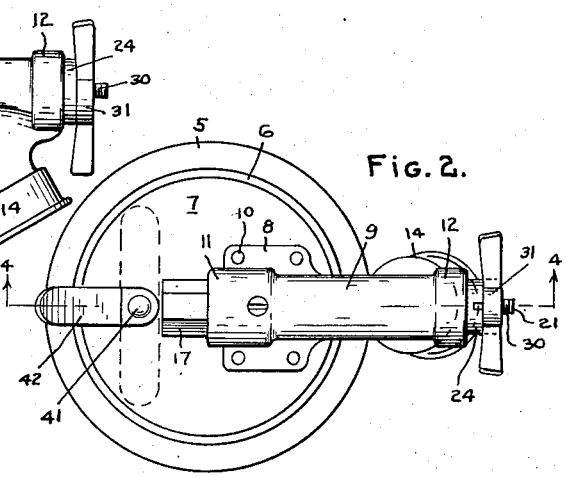
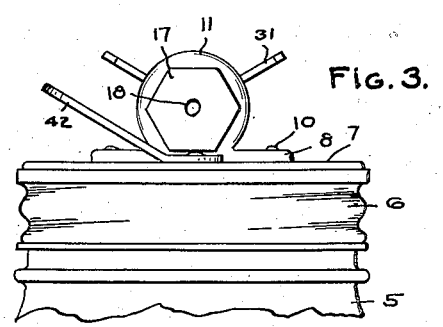
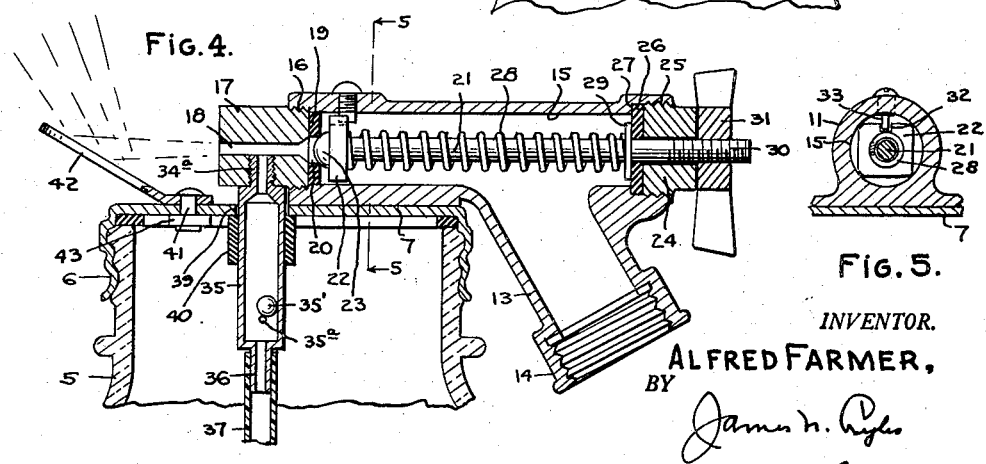
INVENTOR.
ALFRED FARMER,
BY
ATTORNEY

United States Patent Office 2,876,041
Patented Mar. 3, 1959

2,876,041

SPRAY DEVICE

Alfred Farmer, Miami, Fla.

Application April 24, 1957, Serial No. 654,788

1 Claim. (Cl. 299—84)

This invention relates to improvements in spray devices and particularly to a spray device that is coupled with a fluid line, such as a garden hose and with the spray device being detachably engaged with a receptacle whereby to dilute and spray insecticides, plant foods or the like that are soluble in water, and is an improvement over my prior Patent No. 2,761,734.

The invention contemplates a spray device embodying a tubular barrel that is provided with a conventional hose coupling and a cut-off valve and with the barrel at its forward end being connected with a restricted nozzle and with the valve being controllable at the rear end of the barrel by a rotatable handle device whereby the valve is seated and unseated to control the flow of water from the hose coupling to the nozzle together with a tubular siphon device that communicates with the bore of the nozzle and with the siphon depending into the receptacle whereby a flow of water through the nozzle will siphon a predetermined quantity of plant food or the like to be mixed with the water and sprayed from a discharge end of the nozzle.

A further object of the invention resides in a novel siphon tube having disposed therein a ball check valve whereby to stop a siphon action to the receptacle contents so that the spray device functions only to discharge water.

A further and important object of the invention resides in a spray device having the above mentioned characteristics wherein the check valve of the siphon device may be caused to seat by inverting the receptacle and whereby the siphon action is interrupted to the receptacle at such times as the operator is moving from place to place to thereby avoid wasting the receptacle contents and with the siphon device being again operative when the receptacle is again disposed in an upright position so that the flow of water will again set up the siphon action to the receptacle for a discharge of the plant food or the like from the discharge nozzle.

A further object of the invention resides in a deflector tongue that is pivotally supported at a point adjacent the discharge end of the nozzle and that is shiftable into and out of the line of a stream of fluid from the nozzle and, when in the line of discharge, creates a fan like spray for a wide coverage or, when shifted out of the line of the stream to permit of a straight line flow of the fluid to enable the application of plant foods, insecticides or the like at relatively great distances, such as high trees.

Novel features of construction and operation of the device will be more readily apparent during the course of the following description, reference being had to the accompanying drawings, wherein has been illustrated a preferred form of the device and wherein like characters of reference are employed to denote like parts throughout the several figures.

In the drawings:

Figure 1 is a side elevation of a device constructed in accordance with the invention, Figure 2 is a plan view thereof, Figure 3 is a fragmentary front view thereof, Figure 4 is a central longitudinal section taken substantially on line 4—4 of Figure 2 and, Figure 5 is a fragmentary transverse section taken on line 5—5 of Figure 4.

Referring specifically to the drawings, the numeral 5 designates a receptacle, here illustrated as being a conventional glass fruit jar, having an upper threaded end for the reception of a screw cap. The jar may be either a one quart or two quart size as may be found desirable, although the particular apparatus involving this invention may be constructed in relatively larger sizes for application to commercial spray containers.

Threaded upon the end of the jar 5 is a metallic screw cap 6, preferably formed of brass or other material capable of withstanding the corrosive action of certain chemicals employed in insecticides or plant foods. The flat top 7 constitutes the supporting area for the structure to be described.

Rigidly supported upon the top 7, as by integral wing portions 8, is a cylindrical tubular barrel 9. The wings are rigidly connected to the flat top 7, as by rivets or the like 10. The barrel 9 at its forward end is provided with an enlarged cylindrical portion 11, and its opposite end is provided with an enlarged cylindrical portion 12. Formed integral with the barrel 9 is a tubular angular extension 13 carrying at its lower end an internally threaded coupling head 14 for the reception of a male connector of a conventional garden hose, not shown. The head 14 and the extension 13 communicate with the bore 15 of the barrel.

Threaded within the forward end of the barrel 9, as at 16 is a preferably hexagonal nozzle 17. The nozzle 17 in its fully seated position has one of its flat surfaces disposed in parallel relation to the surface 7 of the cap. The nozzle 17 is provided with an axial restricted bore 18 that extends throughout the length of the nozzle and communicates with the bore 15 of the barrel 9 axially thereof. Disposed against the inner end of the nozzle 17, is a non-metallic compressible washer 19, that is centrally apertured at 20. Shiftable axially of the barrel 9, is a valve rod 21 carrying at its forward end a square collar 22 and with the collar being provided with a semi-spherical lug 23 that is adapted to cover and uncover the aperture 20. The forming of the collar 22 square, permits of a flow of water thereby to the aperture 20 and the bore 18. The rod 21 projects rearwardly of the barrel 9 and has guiding engagement in a gland 24 that is threaded within the rear end of the barrel, as indicated at 25. A washer 26 is disposed between the inner end of the gland 24 and a shoulder 27 formed within the barrel. A compressible coil spring 28 surrounds the rod 21 and bears against the collar 22 at one end and against a metallic washer 29, that in turn bears against the washer 26. The rod 21 extends beyond the gland 24, where it is threaded at 30 for the reception of a winged nut 31. It will be apparent from the structure so far described, that when the nut 31 is turned in a clockwise direction, it will bear against the outer end of the gland 24, causing the rod 21 to move rearwardly to unseat the lug 23 and permit of a flow of water from the barrel to the nozzle. The collar 22 is slotted upon its upper straight side as at 32, for the reception of a threaded key 33, that is threaded through an opening formed in the enlargement 11 and with the key projecting into the bore 15 to be in alignment with the slot 32, thus permitting the collar 22 to shift under the influence of the movement of the rod 21 and held against turning movement under the influence of the nut 31.

Threaded within an opening 34 of the nozzle 17, is the nipple portion 34a of a cylindrical valve casing 35. The nipple portion of the valve casing 35, as clearly shown in Figure 4 has its outlet end flush with the lower wall of the bore 18. The valve casing 35 at its lower end is provided with a nipple extension 36, to which is connected in any desirable manner a flexible siphon tube 37. The tube 37 may be formed of plastic or other desirable material and terminates at its lower end in a suitable strainer element 38. The tube 37 and the strainer element 38 preferably terminate at the bottom of the receptacle and to one side, as clearly illustrated in Figure 1. The valve casing 35 extends upwardly through an opening 39 formed in the lid 7 of the cap 6 and a suitable cylindrical and preferably rubber sleeve 40 is engaged over the casing 35 and against the cover 7 so as to effectively prevent leakage around the casing 35 when the device is inverted.

Pivotally connected to the lid 7, as by a cylindrical stud or rivet 41, is an angularly arranged flat deflecting tongue 42. The tongue 42 at its point of connection to the lid 7 is positioned directly in front of the discharge end of the nozzle 17. The tongue 42 is swingable in a horizontal plane, as indicated in Figure 2 so that the tongue may be disposed to either side of the nozzle and out of the line of a stream of fluid being discharged or, it may be swung to a position indicated in Figures 1, 3 and 4 where it is disposed in direct line with the stream of fluid and whereby the stream will strike the surface of the tongue to be spread laterally and forwardly in substantially a fan shape, such being desirable when a relatively fine spray is desired for treating bushes and various relatively low shrubbery. The tongue 42 is frictionally held in the adjusted position by a friction washer 43, such being desirable to prevent looseness and an undesired shifting of the tongue under the influence of the force of the fluid from the nozzle. Disposed within the valve casing 35 is a ball valve 35'. The ball 35' is held against seating within the lower end of the casing, by a cross-pin 35a. The ball 35' may seat at the upper end of the casing 35 to close the flow of fluid through the upper nipple under the siphoning influence of the water passing through the nozzle 17. It is pointed out, that all of the parts, with the exception of the jar 5 and the tube 37 shall be formed of brass or other non-corrosive material.

In the use of the device, the cap 6 and its associated elements are removed from the jar and a predetermined quantity of fertilizer, insecticide or the like is placed within the jar. It is estimated that the amount of water passing through the device to be sprayed from the nozzle will be approximately 15 gallons in order to completely siphon the contents of the jar and the quantity of material placed within the jar will be governed accordingly. After the material has been placed within the jar, the hose is connected to the head 14. The jar may either be filled prior to its attachment to the head 6 or, the head 6 may be screwed in position, with the tube 17 extending to the bottom of the jar. If the user prefers to fill the jar after the cap 6 has been placed in position, he may turn the nut 31 in a clock wise direction and then by holding his finger over the discharge end of the nozzle 17, will direct a flow of water from the hose, through the barrel 9, past the valve lug 23 to the nozzle 17 and then downwardly through the valve casing 35 to be discharged through the valve casing 35 to be discharged through the strainer 38, and this may be continued until the jar is properly filled, and in the case of soluble materials, the user should continue to agitate the jar for a proper mixing of the contents. With the jar properly filled, the operator may continue to turn the nut 31 in a clock wise direction, shifting the valve rod 31 rearwardly to fully uncover the aperture 20 of the washer and permit of a full flow of water to pass through the bore 18 for a discharge to the particular area to be treated. As the force of the water passes through the bore 18, it will create a siphon action to the jar contents through the casing 15 and tube 37, creating a diluted mixture as it is discharged from the nozzle. When it is desired to create a fan shape spray, the tongue 42 is swung forwardly to lie in the path of the stream from the nozzle, such action causing a relatively fine spray that covers a considerable area. When trees or the like having considerable height are to be sprayed, it becomes necessary that the maximum stream of fluid be employed, and in such cases the tongue 42 is swung to either side as indicated in dotted lines in Figure 2. When the operator is spraying trees that are spaced apart a considerable distance, he must walk with the spray device to the point of use and, to prevent a waste of the material, the jar is inverted, permitting the ball 35' to drop downwardly and close the upper nipple thus preventing any further siphon action, but permitting only clear water to be discharged from the nozzle. When the operator reaches the next point to be sprayed, he normally places his finger over the discharge end of the bore 18, such action forcing the ball 35' off its seat and causing it to drop down against the pin 35a. The device then continues to function as a siphon spray. The valve can be controlled to a relatively fine degree for controlling the force of the water to be discharged from the nozzle, by rotating the nut 31. A greater opening to the nozzle is obtained by rotating the nut in a clock wise direction and when the flow of water is to be interrupted to the nozzle, the nut 31 is rotated in a counterclockwise direction, thus permitting the spring 28 to progressively seat the lug 23 with repect to the aperture 20.

It will be apparent from the foregoing that a very novel and highly effective spray mechanism has been provided. The parts are few and simple, cheap to manufacture and offers a spray device capable of spraying relatively wide areas and relatively high areas, such as trees. The novel form of check valve as disposed within the siphon line is especially advantageous in checking the flow of the jar contents and preventing a wastage of materials in places where it is not desired. The barrel and the extension 13 when the hose is attached thereto provides a very convenient hand grip whereby to easily direct the spray in the desired direction, thus avoiding the necessity and additional cost of forming a separate handle, such as has been provided in prior art patents. The device presented herewith is a very distinct improvement over my prior patent heretofore noted and the structure of this device is most effective in use and considerably cheaper to manufacture than that previously disclosed in my patent.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A spray device comprising a receptacle for a solution of plant foods and insecticides, the receptacle having a flat cap secured on its upper end, the top of the cap having an opening therethru, a cylindrical barrel secured on the cap, the barrel being internally threaded at each end, first and second plugs threaded into the threaded ends of the barrel, each plug having an axial bore therethru, the axial bore thru the first plug being smaller than that thru the second plug, and serving as a nozzle, the said first plug having a radial passage, internally threaded and communicating with the axial bore in the plug, a casing having a threaded nipple on one end which nipple is threaded into the radial passage and has its end flush with the interior wall of the axial bore in the plug, the casing extending thru the opening in the cap and into the receptacle and having a flexible tube on its end extending down to a position adjacent the bottom of the receptacle, a resilient sealing band positioned around the casing adjacent its upper end engaging the under side of the cap to provide a fluid seal between the casing and the cap, the first plug having a valve seat on its inner end, a valve rod extending axially of the barrel and extending thru the axial bore in the second plug, said rod having on its inner end a polygonal plate, a valve secured on said plate and adapted to close the opening thru the valve seat, said plate having a slot in its edge and a pin extending thru the wall of the barrel and into said slot to prevent rotation of the plate in the barrel, the rod having a spring surrounding it, the spring engaging the face of the plate and engaging the inner end of the second plug and biased to urge the plate to position the valve on its seat, the outer end of the rod being screwthreaded and having a hand nut threaded thereon, the hand nut having radial wings rotation of the hand nut in one direction moving the rod outwardly of the barrel to move the valve off its seat and rotation in the opposite direction permitting the spring to move the valve upon its seat, the barrel having an angularly extending portion having on its outer end a fitting to which a fitting on the end of a water hose may be attached, the said valve being positioned in the barrel between the angularly extending portion of the barrel and the plug having the nozzle bore therein.

References Cited in the file of this patent

UNITED STATES PATENTS

| | | |
|---|---|---|
| 193,522 | Koegler | July 24, 1877 |
| 2,064,794 | Klauminzer | Dec. 15, 1936 |
| 2,260,603 | Budwig | Oct. 28, 1941 |
| 2,612,403 | Burch | Sept. 30, 1952 |
| 2,732,171 | Paradise | Jan. 24, 1956 |
| 2,761,734 | Farmer | Sept. 4, 1956 |